US007320383B1

(12) United States Patent
Plate

(10) Patent No.: US 7,320,383 B1
(45) Date of Patent: Jan. 22, 2008

(54) HEAVY DUTY FOLD OUT SAW HORSE

(76) Inventor: John W. Plate, 25700 Kensingto La., Monee, IL (US) 60449

( * ) Notice: Subject to any disclaimer, the term of this patent is extended or adjusted under 35 U.S.C. 154(b) by 343 days.

(21) Appl. No.: 11/078,270

(22) Filed: Mar. 11, 2005

(51) Int. Cl.
*F16M 11/00* (2006.01)

(52) U.S. Cl. .................................... 182/186.4; 182/151

(58) Field of Classification Search ................ 182/151, 182/152, 153, 181.1–182.5, 186.5, 224, 225
See application file for complete search history.

(56) References Cited

U.S. PATENT DOCUMENTS 1,962,089 A * 6/1934 Davidson .................... 248/459
1,971,912 A * 8/1934 Horwath .................... 248/459
4,005,537 A 2/1977 von Camber et al.
4,014,404 A 3/1977 Jackson
4,066,145 A 1/1978 Pavese
4,182,432 A * 1/1980 Cossitt ....................... 182/151
4,190,001 A * 2/1980 Cecala ....................... 108/161
4,403,678 A 9/1983 Zieg
4,570,752 A 2/1986 Chapman et al.
4,763,757 A * 8/1988 Cheney ....................... 182/21
4,771,863 A 9/1988 Stansberry
4,926,966 A 5/1990 Boudreau
5,193,598 A 3/1993 Estrem
5,351,882 A * 10/1994 Krautsack ................ 206/45.26
5,377,780 A 1/1995 Dunaway
5,582,267 A * 12/1996 Bockoven et al. .......... 182/153
5,921,347 A 7/1999 Rodriguez et al.
5,954,156 A 9/1999 Cooke

* cited by examiner

*Primary Examiner*—Alvin Chin-Shue

(57) ABSTRACT

A saw horse includes leg support members that have top and bottom portions, and planar front and rear surfaces. The top portions have a notch formed therein. Coextensive support arms are pivotally connected to the leg support members. Each support arm has a top and bottom edge, and is adaptable between folded and unfolded positions. A first support beam is removably positionable into the notch, extending downwardly. The first support beam has opposed end portions situated away from the leg support members and has a major longitudinal length thereof horizontally intercalated between the leg support members. A second support beam is removably positional in the notch and has a bottom surface engaged with the first support beam, defining a work surface. Rubber pads are engaged with the bottom portions of the leg support members, assisting to maintain the saw horse at a stable position during operating conditions.

1 Claim, 4 Drawing Sheets

HEAVY DUTY FOLD OUT SAW HORSE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to saw horses and, more particularly, to a heavy duty fold out saw horse for cutting lumber.

2. Prior Art

The use of Saw Horse devices is known in the prior art. More specifically, Saw Horse devices heretofore utilized are known to consist basically of familiar, expected and obvious structural configurations, notwithstanding the myriad of designs encompassed by the crowded prior art which have been developed for the fulfillment of countless objectives and requirements.

The saw horse is a general purpose support device well known in the construction trades. A typical saw horse includes two pairs of legs with a cross beam mounted between the pairs, each pair of legs describing a generally triangular shape with the ground. At least one board may be disposed on top of a pair of saw horses, either as a work piece or as a work surface or as a small scaffolding. The portability, versatility, and economical construction of saw horses provide great utility.

It has long been noted that the convenience and functionality of the saw horse may be improved by departing from rigid structural designs. It has been found desirable to provide the saw horse with pivoting or collapsible members for convenient storage, and with some means for adjusting the height of the saw horse for various applications. It is further desirable to construct a saw horse from light weight materials to provide ease in transportation. Yet another desirable feature is some means for maintaining the saw horse in a stable and balance position on a sloping ground surface. Various modifications in the design and construction of saw horses have been proposed to accomplish these objectives.

Accordingly, a need remains for a saw horse that is that is sturdy and durable, yet easy to set-up, use, and store. The present invention satisfies such a need by providing a heavy duty fold out saw horse designed to accommodate 2×10 and 2×12 pieces of lumber of varying lengths. Such a saw horse is easy to set-up and reduces the amount of lumber normally wasted building job site saw horses. The present invention accommodates 2×12 pieces of lumber in a flat or standing position and is easily adjustable.

BRIEF SUMMARY OF THE INVENTION

In view of the foregoing background, it is therefore an object of the present invention to provide a heavy duty fold out saw horse. These and other objects, features, and advantages of the invention are provided by an adjustable saw horse for cutting 2×10 and 2×12 sized lumber.

The saw horse includes a plurality of leg support members that have trapezoidal shapes. Such leg support members may have opposed outer edges converging upwardly towards the top portions respectively. Each leg support member further has top and bottom portions. Such top portions are provided with a notch formed therein and extending downwardly therefrom wherein the notch terminates above a midpoint between the top and bottom portions. Such a notch is preferably T-shaped for selectively receiving the first and second support beams and maintaining the first and second support beams at substantially orthogonal positions during operating conditions.

The leg support members are removably positional on a ground surface and maintain a fixed spatial relationship defined along a linear axis during operating conditions. Such leg support members further have substantially planar front and rear surfaces monolithically formed with the top and bottom portions. Furthermore, the leg support members are preferably coextensive.

A plurality of support arms are pivotally connected to the leg support members. Each support arm has a top and bottom edge terminating above the top portions and registered horizontally with the bottom portions respectively. Each of the support arms are conveniently adaptable between folded and unfolded positions defined at parallel and perpendicular angles with the leg support members respectively. The support arms are coextensive and preferably have respective fulcrum axes extending parallel to a lower portion of the notch such that the fulcrum axis is registered medially between the outer edge portions. Such fulcrum axes are offset from a vertical plane.

A first elongated support beam has a rectangular shape and is removably positionable into the notch such that the first support beam extends downwardly towards the midpoint. Such a first support beam has opposed end portions laterally situated away from the leg support members in such a manner that a major longitudinal length of the first support beam is horizontally intercalated between the leg support members.

A second support beam is removably positional in the notch wherein the second support beam has a planar bottom surface engaged with a top edge of the first support beam. Such a second support beam horizontally extends along the top edge of the first support beam and defines a convenient work surface registered perpendicular to the first support beam. The second support beam preferably has a longitudinal length greater than the longitudinal length of the first support beam. A plurality of rubber pads are engaged with the bottom portions of the leg support members for advantageously assisting to maintain the saw horse at a substantially stable position during operating conditions.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
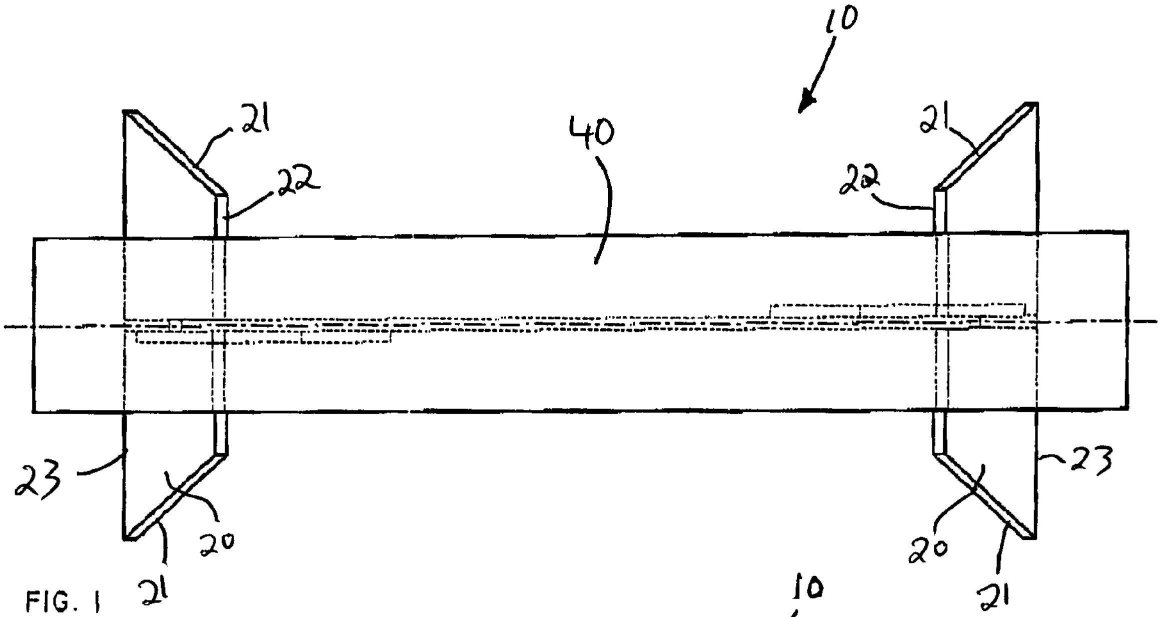
FIG. 1 is a top plan view showing a heavy duty fold out saw horse, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-19 by the reference numeral 10 and is intended to provide a heavy duty fold out saw horse. It should be understood that the assembly 10 may be used to provide many different types of work surfaces and should not be limited in use to only sawing applications.

Figure 2:
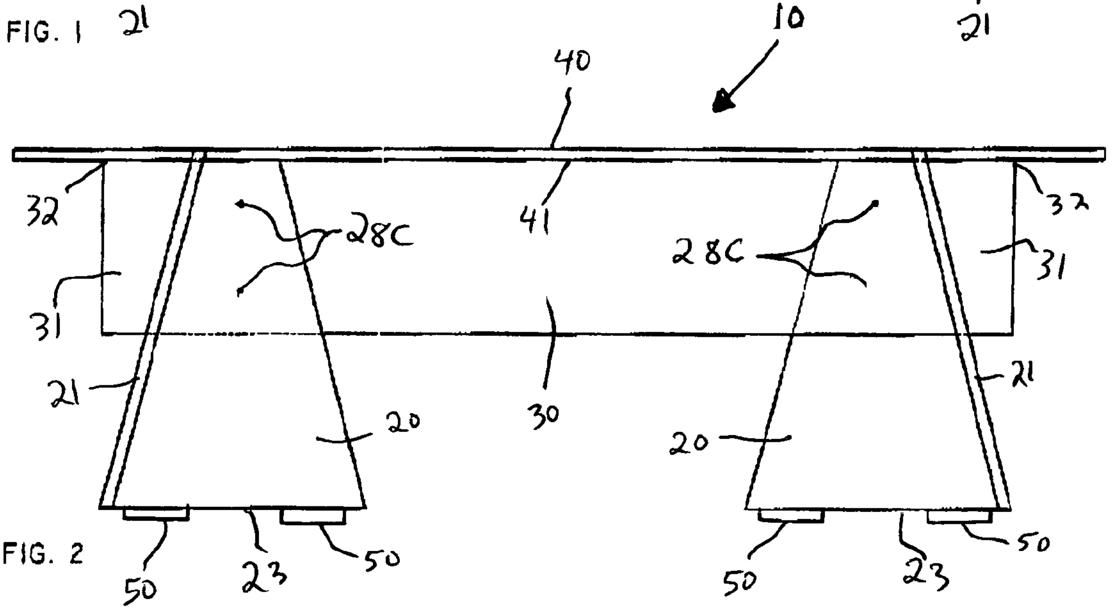
FIG. 2 is a perspective view of the saw horse shown in FIG. 1.
Figure 3:
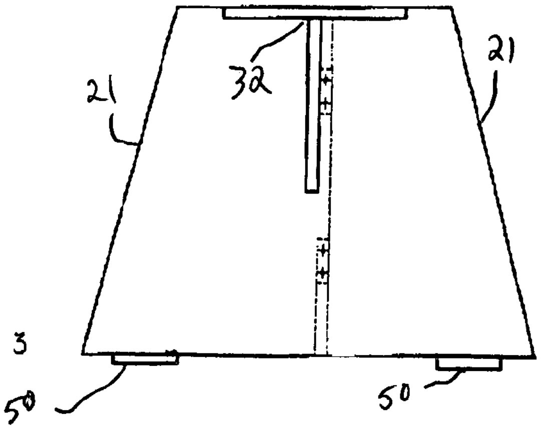
FIG. 3 is a side elevational view of the rear surface of the leg support member shown in FIG. 2.
Figure 4:
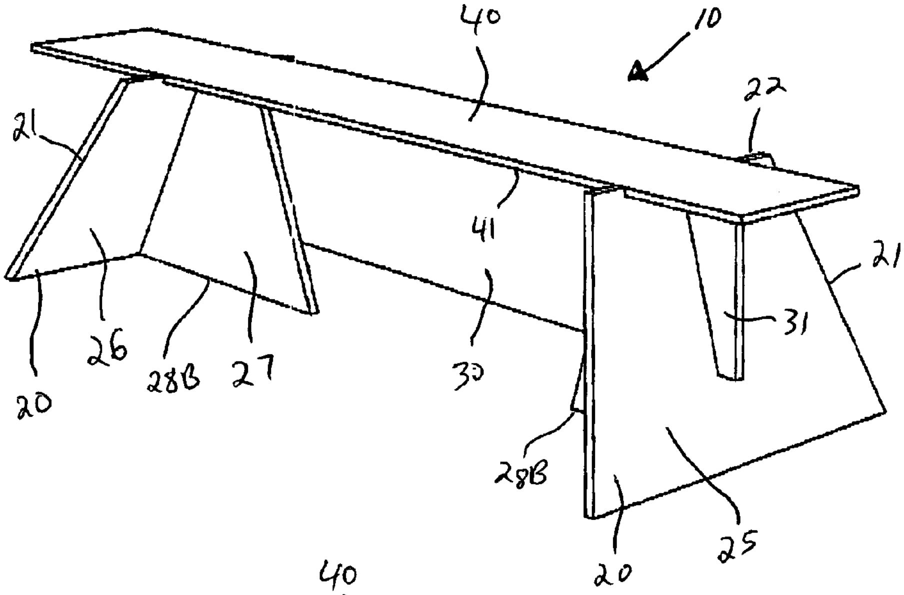
FIG. 4 is a perspective view of the saw horse shown in FIG. 1.

Referring initially to FIGS. 1, 2, and 4, the assembly 10 includes a plurality of leg support members 20 that have trapezoidal shapes. Of course, the leg support members 20 may be alternately shaped, as is obvious to a person of ordinary skill in the art. Each leg support member 20 has top 22 and bottom 23 portions. Such leg support members 20 have opposed outer edges 21 converging upwardly towards the top portions 22 respectively. Such top portions 22 are provided with a notch 24 formed therein and extending downwardly therefrom wherein the notch 24 terminates above a midpoint between the top 22 and bottom 23 portions. Such a notch 24 is T-shaped for selectively receiving the first 30 and second 40 support beams (described herein below) and maintaining the first 30 and second 40 support beams at substantially orthogonal positions during operating conditions. The notches 24 are furthermore essential for conveniently maintaining the first 30 and second 40 support beams at stationary positions during operating conditions.

Referring to FIGS. 1, 2, and 4, the leg support members 20 are removably positional on a ground surface and maintain a fixed spatial relationship defined along a linear axis during operating conditions. Such leg support members 20 further have substantially planar front 25 and rear 26 surfaces monolithically formed with the top 22 and bottom 23 portions. Furthermore, the leg support members 20 are coextensive.

Figure 17:
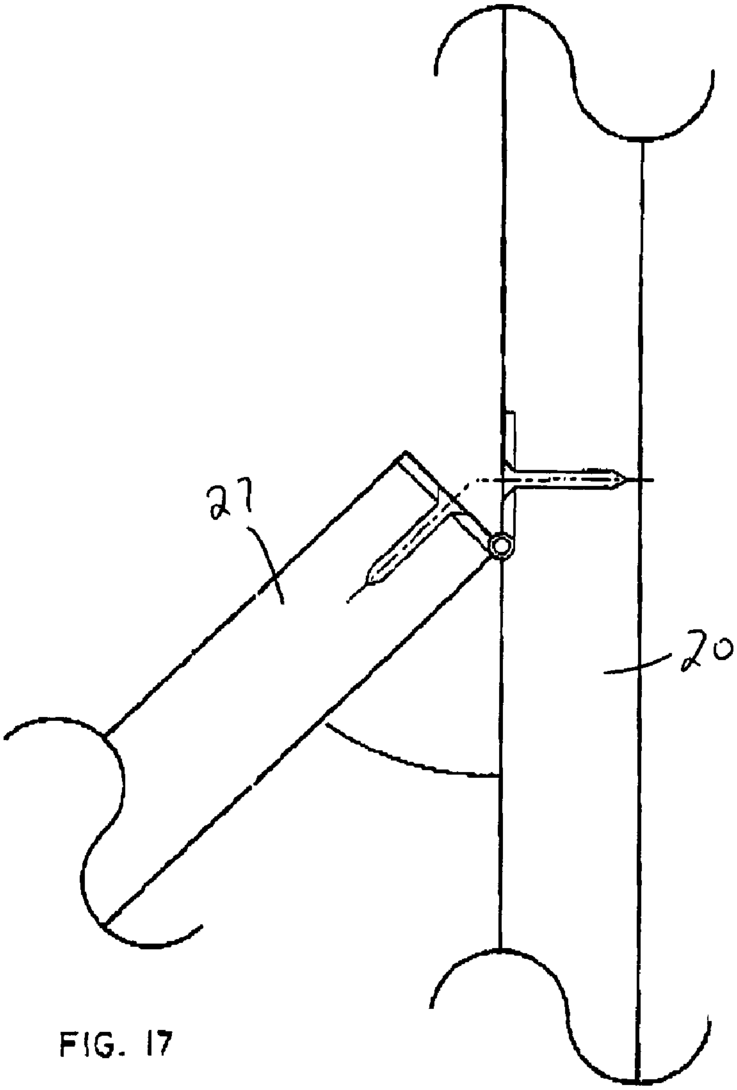
FIG. 17 is a cross-sectional view of a hinge fastened to the support arm and leg support member
Figure 18:
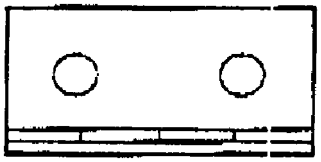
FIG. 18 is a top plan view of a hinge.
Figure 19:
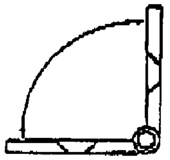
FIG. 19 is a top plan view of a hinge illustrating its pivoting movement.

Referring to FIGS. 13-16, a plurality of support arms 27 are pivotally connected to the leg support members 20. Each support arm 27 has a top 28A and bottom 28B edge terminating below the top portions 22 and registered horizontally with the bottom portions 23 respectively. Each of the support arms 27 are conveniently adaptable between folded and unfolded positions defined at parallel and perpendicular angles with the leg support members 20 respectively. The support arms 27 are coextensive and have respective fulcrum axes 29 extending parallel to a lower portion 24A of the notch 24 such that the fulcrum axis 29 is registered medially between the outer edge portions 21. Such fulcrum axes 29 are offset from a vertical plane. The support arms 27 may be pivotally connected to the leg support members 20 using a conventional hinge and fastening screws, as shown in FIGS. 17-19, as is obvious to one having ordinary skill in the art. The support arms 27 further include a plurality of apertures 28C formed subjacent to the top edge 28A thereof. Such apertures 28C advantageously allow the first support member 30 to be fastened to the support arms 27 for further increasing the structural rigidity of the assembly 10.

Figure 8:
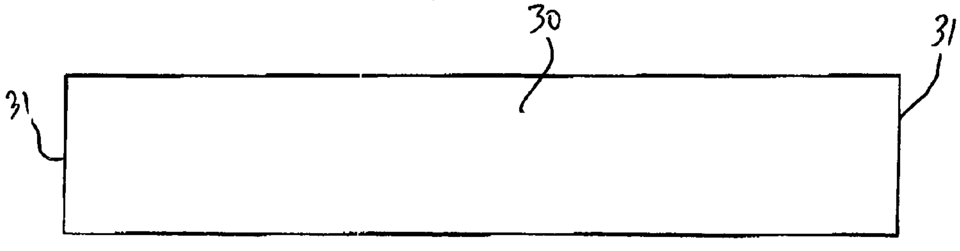
FIG. 8 is a top plan view of the first support beam.
Figure 9:
FIG. 9 is a side elevational view of the first support beam shown in FIG. 8.
Figure 10:
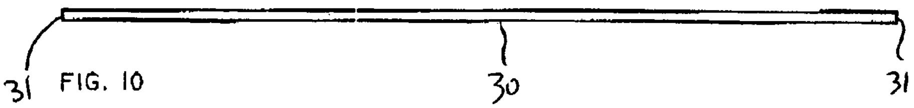
FIG. 10 is a front elevational view of the first support beam shown in FIG. 8.
Figure 11:
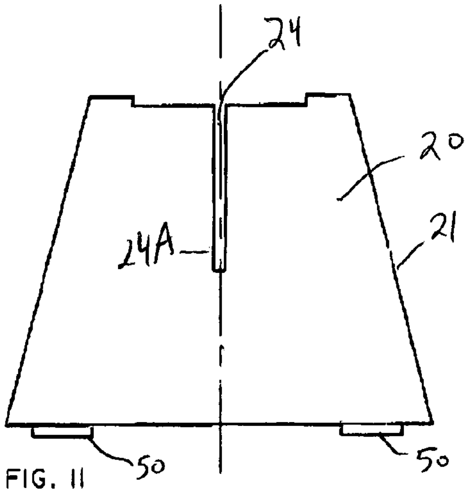
FIG. 11 is a side elevational view of the front surface of the leg support member showing the notch formed therein and fulcrum axis.
Figure 12:
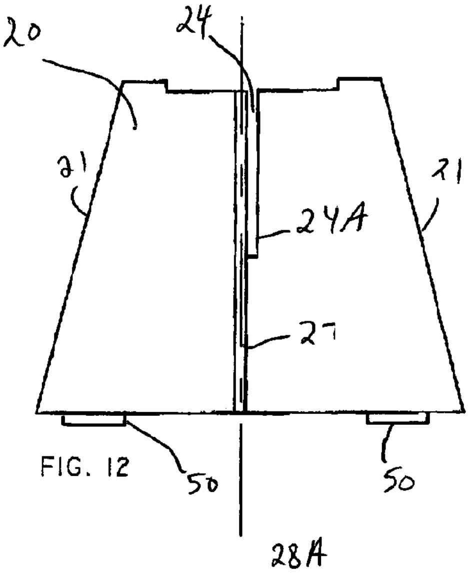
FIG. 12 is a side elevational view of the rear surface of the leg support member showing the support arm.
Figure 13:
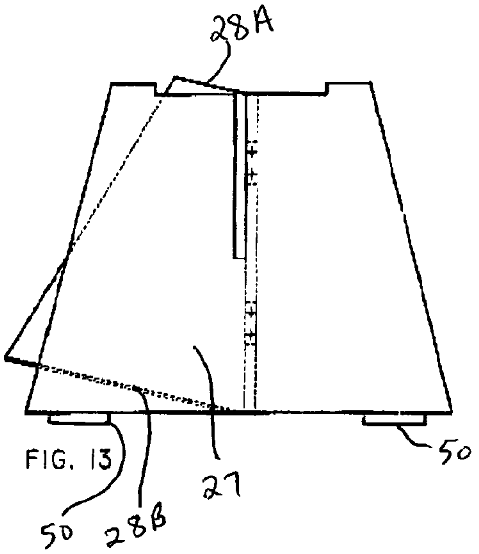
FIG. 13 is a side elevational view of the leg support member showing the support arm at a folded position and pivotally connected at an alternate position.
Figure 14:
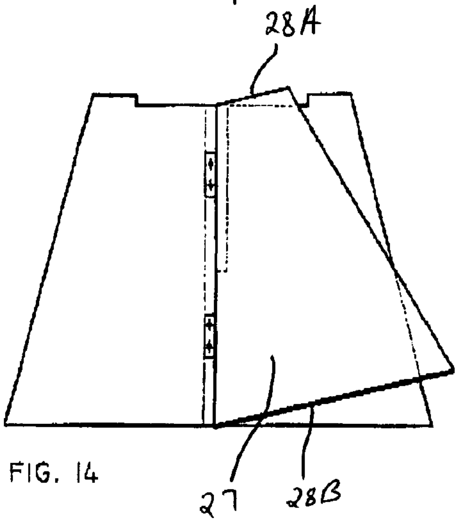
FIG. 14 is a side elevational view of the leg support member showing the support arm at a folded position and pivotally connected at the position shown in FIG. 12.

Referring to FIGS. 8-10, a first elongated support beam 30 has a rectangular shape and is removably positionable into the notch 24 such that the first support beam 30 extends downwardly towards the midpoint. Such a first support beam 30 has opposed end portions 31 laterally situated away from the leg support members 20 in such a manner that a major longitudinal length of the first support beam 30 is horizontally intercalated between the leg support members 20. Of course, the horizontal length intercalated between the leg support members 30 may be adjusted as the user's needs require, as is obvious to a person of ordinary skill in the art.

Figure 5:
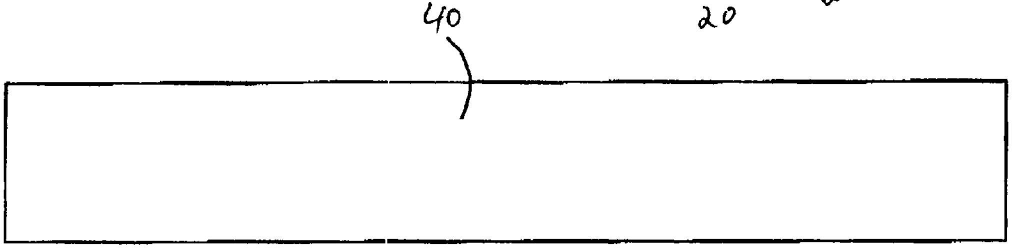
FIG. 5 is a top plan view of the second support beam.
Figure 6:
FIG. 6 is a side elevational view of the second support beam shown in FIG. 5.
Figure 7:
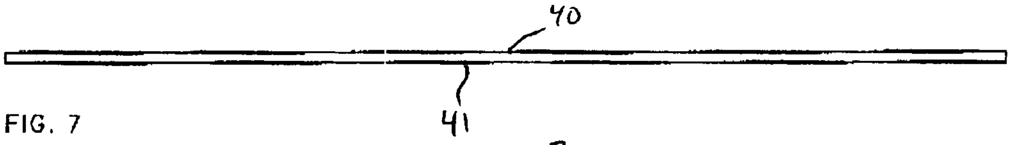
FIG. 7 is a front elevational view of the second support beam shown in FIG. 5.

Still referring to FIGS. 5-7, a second support beam 40 is removably positional in the notch 24 wherein the second support beam 40 has a planar bottom surface 41 engaged with a top edge 32 of the first support beam 30. Such a second support beam 40 horizontally extends along the top edge 32 of the first support beam 30 and is crucial for defining a convenient work surface registered perpendicular to the first support beam 30. The second support beam 40 has a longitudinal length greater than the longitudinal length of the first support beam 30, allowing the second support beam 40 to be more securely balanced on the first support beam 30.

Figure 15:
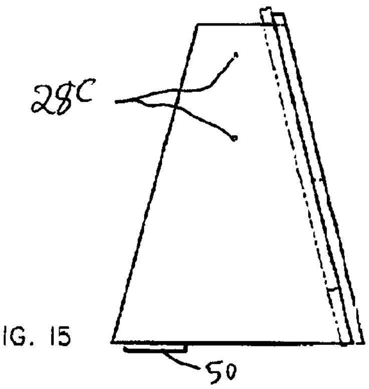
FIG. 15 is a side elevational view of the support arm.
Figure 16:
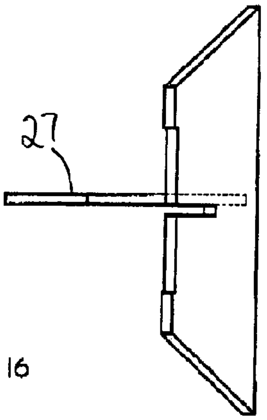
FIG. 16 is a top plan view of the leg support member and support arm attached thereto.

Referring to FIGS. 2, 3, and 11-13, a plurality of rubber pads 50 are engaged with the bottom portions 23 of the leg support members 20 for advantageously assisting to maintain the saw horse 10 at a substantially stable position during operating conditions. Such rubber pads 50 are thus important for increasing a user's safety while using the assembly 10. Of course, the rubber pads 50 may be engaged with the bottom edge 28B of the support arms 27, as is illustrated in FIG. 15, and as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An adjustable saw horse for cutting 2×10 and 2×12 sized lumber, said saw horse comprising:

a plurality of leg support members having a trapezoidal shape, each said leg support members further having top and bottom portions, said top portion being provided with a notch formed therein and extending downwardly therefrom wherein said notch terminates above a midpoint between said top and bottom portions, said leg support members being removably positional on a ground surface and maintaining a fixed spatial relationship defined along a linear axis during operating conditions, said leg support members further having substantially planar front and rear surfaces monolithically formed with said top and bottom portions, said bottom portions having bottom edges for resting on said ground surface;

a plurality of support arms pivotally connected to said leg support members, each said support arms having top and bottom edges terminating below said top portions and registered horizontally with said bottom portions respectively, each said support arms being adaptable between folded and unfolded positions defined at parallel and perpendicular angles with said leg support members respectively, said support arms are coextensive, wherein said bottom edges of said support arms are coplanar with said leg bottom edges of said support members respectively;

a first elongated support beam having a rectangular shape and being removably positioned into the notch such that said first support beam extends downwardly towards the midpoint, said first support beam having opposed end portions laterally situated away from said leg support members in such a manner that a major longitudinal length of said first support beam is horizontally intercalated between said leg support members;

a second support beam removably positioned in the notch wherein said second support beam has a planar bottom surface engaged with a top edge of said first support beam, said second support beam horizontally extending along said top edge of said first support beam and defining a work surface registered perpendicular to said first support beam; and a plurality of rubber pads engaged with said bottom portions of said leg support members for assisting to maintain said saw horse at a substantially stable position during operating conditions;

wherein said second support beam have a longitudinal length greater than the longitudinal length of said first support beam;

wherein said leg support member have opposed outer edges converging upwardly towards said top portions respectively;

wherein the notch is T-shaped for selectively receiving said first and second support beams and maintaining said first and second support beams at substantially orthogonal positions during operating conditions;

wherein said leg support members are coextensive;

wherein said support arms have respective fulcrum axes extending parallel to a lower portion of the notch such that said fulcrum axis is registered medially between said outer edge portions;

wherein said first support beam extends parallel to a centrally registered longitudinal axis passing through said support second support beam;

wherein a first one of said support arms is offset to a left side of the centrally registered longitudinal axis and a second one of said support arms is offset to a right side of the centrally registered longitudinal axis;

wherein said first and second support arms are positioned on opposite sides of said first support beam such that said first and second support arms do not lay along a single plane.

* * * * *